United States Patent
Nordeen et al.

(10) Patent No.: US 12,533,283 B2
(45) Date of Patent: *Jan. 27, 2026

(54) PROCESSING GENERATED SENSOR DATA ASSOCIATED WITH DEEP VEIN THROMBOSIS (DVT) DEVICE USAGE

(71) Applicant: Impact IP, LLC, Rocklin, CA (US)

(72) Inventors: Taylor Nordeen, Rocklin, CA (US); Austin Phillips, Rocklin, CA (US)

(73) Assignee: Impact IP, LLC, Rocklin, CA (US)

( * ) Notice: Subject to any disclaimer, the term of this patent is extended or adjusted under 35 U.S.C. 154(b) by 959 days.

This patent is subject to a terminal disclaimer.

(21) Appl. No.: 17/512,311

(22) Filed: Oct. 27, 2021

(65) Prior Publication Data

US 2022/0125667 A1    Apr. 28, 2022

Related U.S. Application Data

(60) Provisional application No. 63/106,756, filed on Oct. 28, 2020.

(51) Int. Cl.
*A61H 11/00* (2006.01)
*G08B 21/02* (2006.01)
(Continued)

(52) U.S. Cl.
CPC .............. *A61H 11/00* (2013.01); *G08B 21/02* (2013.01); *G16H 40/67* (2018.01);
(Continued)

(58) Field of Classification Search
CPC .............. A61H 11/00; A61H 2011/005; A61H 2201/0184; A61H 2201/5007;
(Continued)

(56) References Cited

U.S. PATENT DOCUMENTS

| 2007/0179521 A1 | 8/2007 | Horvat |
| 2008/0013705 A1 | 1/2008 | Yoffie et al. |

(Continued)

FOREIGN PATENT DOCUMENTS

| WO | 2009125327 A1 | 10/2009 |
| WO | 2017127157 A1 | 7/2017 |

OTHER PUBLICATIONS

Office Action dated Aug. 19, 2024 for U.S. Appl. No. 17/512,322.
(Continued)

*Primary Examiner* — Michael J Brown
(74) *Attorney, Agent, or Firm* — Dorsey & Whitney LLP

(57) ABSTRACT

Processing generated sensor data of a mobile deep vein thrombosis (DVT) device may include identifying use of the mobile DVT device corresponding to a user. Sensor data associated with the user's identified use of the mobile DVT device may be generated. At least some of the generated sensor data may comprise use data associated with a duration of use of the mobile DVT device by the user. A protocol associated with use of the mobile DVT device may be processed. The generated use data and the protocol associated with use of the mobile DVT device may be correlated. Based on correlating the generated use data and the protocol, an alert associated with the generated use data and the protocol may be generated.

20 Claims, 4 Drawing Sheets

(51) Int. Cl.
*G16H 40/67* (2018.01)
*G16H 80/00* (2018.01)

(52) U.S. Cl.
CPC .................. *A61H 2011/005* (2013.01); *A61H 2201/0184* (2013.01); *A61H 2201/5007* (2013.01); *A61H 2209/00* (2013.01); *A61H 2230/50* (2013.01)

(58) Field of Classification Search
CPC .. A61H 2209/00; A61H 2230/50; A61H 9/00; A61H 2201/5097; A61H 2230/505; G08B 21/02; G16H 40/67; G16H 80/00; G16H 40/63; G16H 50/20
USPC .......................................................... 700/90
See application file for complete search history.

(56) References Cited

U.S. PATENT DOCUMENTS

| | | | |
|---|---|---|---|
| 2012/0065561 A1 | 3/2012 | Ballas et al. | |
| 2012/0179020 A1 | 7/2012 | Wekell | |
| 2012/0259648 A1 | 10/2012 | Mallon et al. | |
| 2013/0096953 A1 | 4/2013 | Beverly et al. | |
| 2014/0263616 A1 | 9/2014 | Zhuang | |
| 2017/0100300 A1 | 4/2017 | Rapp et al. | |
| 2019/0029566 A1* | 1/2019 | Sundaram | A61B 5/7278 |
| 2019/0051393 A1 | 2/2019 | Whiting et al. | |
| 2019/0150830 A1 | 5/2019 | Barak | |
| 2020/0315905 A1* | 10/2020 | Rizzo | A61H 1/00 |
| 2022/0125382 A1* | 4/2022 | Nordeen | A61B 5/6828 |
| 2022/0223278 A1 | 7/2022 | Nordeen et al. | |

OTHER PUBLICATIONS

Office Action dated Feb. 26, 2024 for U.S. Appl. No. 17/647,932.
Office Action dated Jul. 17, 2024 for U.S. Appl. No. 17/647,932.
Ernesto, "Fitbit Reminders to Move Show Impact", https://www.fitabase.com/blog/post/fitbit-eminders-to-move-show-impact/, 2017.
Sturm, "The Evolution of Lymphedema Treatment", https://airosmedical.com/the-evolution-of-lymphedema-treatment/#:~:text=Pneumatic%20compression%20devices%20and%20pumps,in%20hospitals%20and%20rehabilitation%20centers, 2023.
International Search Report and Written Opinion dated Feb. 21, 2022 for PCT/US2021/056857.
Office Action dated Mar. 26, 2025 for U.S. Appl. No. 17/512,322.
Office Action dated Apr. 3, 2025 for U.S. Appl. No. 17/647,932.
Office Action dated Jul. 3, 2025 for U.S. Appl. No. 17/512,322.

* cited by examiner

PROCESSING GENERATED SENSOR DATA ASSOCIATED WITH DEEP VEIN THROMBOSIS (DVT) DEVICE USAGE

RELATED APPLICATIONS

The present application claims priority to U.S. Provisional Application No. 63/106,756, filed on Oct. 28, 2020 and titled, "PROCESSING GENERATED SENSOR DATA ASSOCIATED WITH DEEP VEIN THROMBOSIS (DVT) DEVICE USAGE," the disclosure of which is incorporated herein by reference in its entirety.

TECHNICAL FIELD

The present disclosure relates to systems and methods for processing generated sensor data of a mobile deep vein thrombosis (DVT) device.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
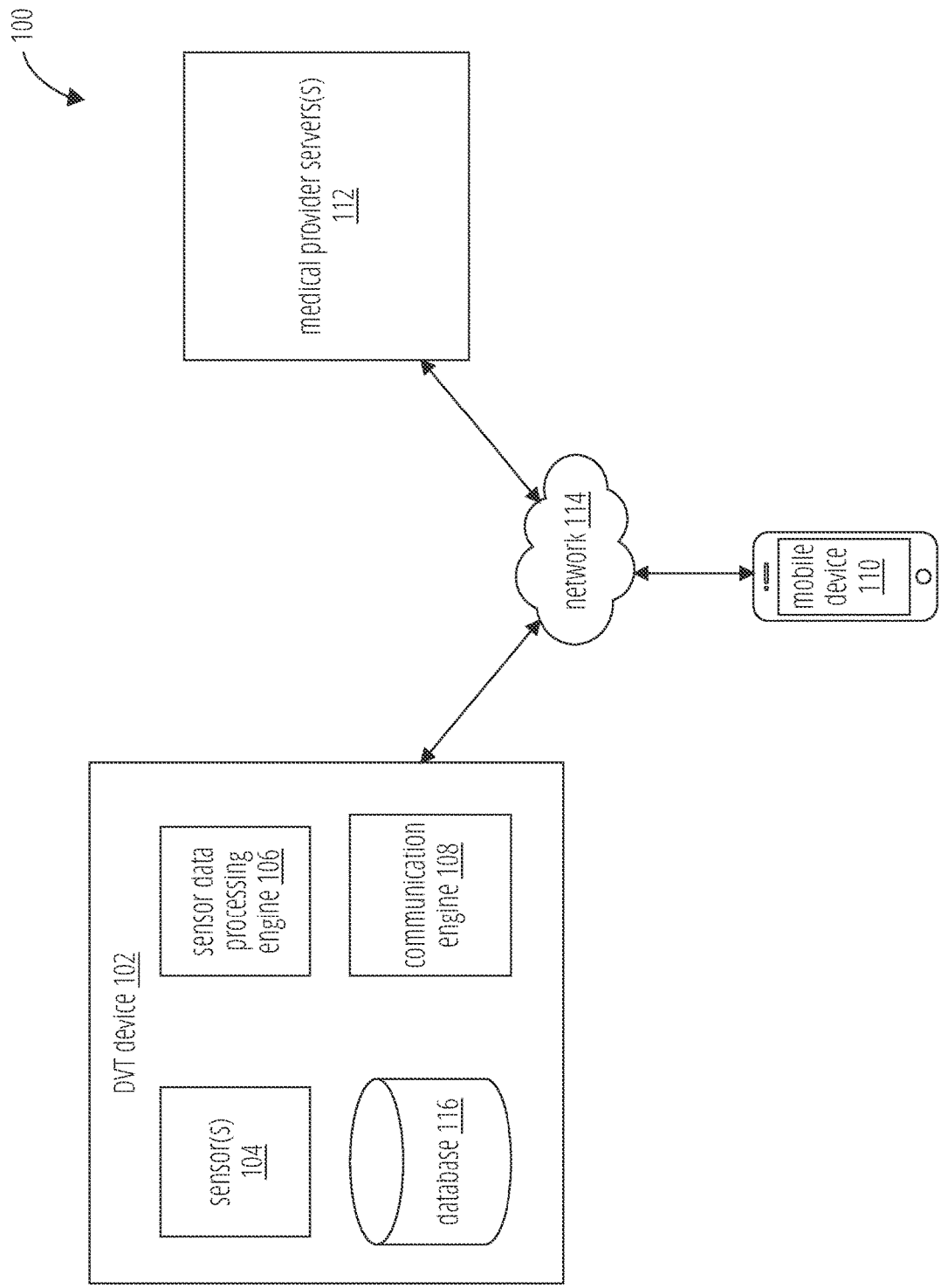
FIG. 1 illustrates an exemplary environment for processing generated sensor data of a mobile deep vein thrombosis (DVT) device.

Venous thrombosis occurs when a blood clot or thrombus forms in the veins. Venous thrombosis may affect superficial or deep veins. Over time, serious conditions may develop to include edema, pain, stasis pigmentation, dermatitis, ulceration and the like. Serious cases of venous thrombosis may lead to phlegmasia *cerulea dolens* in which the extremities of the patient turn blue and may lead to gangrene and death. Various other ailments and conditions can also result from complications of venous thrombosis.

Venous thrombosis occurrences often begin in the valve cusps of deep calf veins. Tissue thromboplastin is released, forming thrombin and fibrin that trap red blood cells (RBCs) and propagate proximally as a red or fibrin thrombus, which is the predominant morphologic venous lesion. At times, symptoms can appear within hours. Other related conditions may include varicose veins associated with valvular dysfunction that causes aching, fatigue, subcutaneous ulcerations. Less frequently, varicose veins may cause superficial thrombophlebitis and pulmonary embolisms.

Arterial vascular disorders such as peripheral arterial occlusion may result in acute ischemia manifested in cold, painful and discolored extremities. In acute cases, the locations distal to an obstruction may lack a pulse. Chronic occlusion may be manifested in a decreased ability to walk relatively long distances, pain to the extremities, compromised tissue viability, and even gangrene.

Notably, increasing blood flow in limbs during periods of immobility has proven to prevent DVT formation in the limbs and to ease the suffering of peripheral vascular disorders. Increasing blood flow may also prevent the formation of a pulmonary embolism, which commonly originate from such disorders. Increasing the venous return and arterial flow can also prevent formation of edema, pain and discomfort in the limbs during periods of immobilization and assist in the prevention of arterial stenosis and occlusion.

Reduced circulation through limbs can also be observed in conditions affecting the arterial system such as diabetes mellitus. It is believed that various vascular alterations such as accelerated atherosclerosis resulting in thickened arterial walls and diabetic microangiopathy resulting in dysfunctional nerves are responsible for impaired circulation in a diabetic limb. Reduced blood supply to the limb may entails stasis and ischemia in the distal limb, which ischemia can lead to necrosis of the tissue and secondary infections and/or inflammations. In addition, lack of cutaneous sensation caused by the loss of sensory nerves due to the diabetic neuropathy may prevent a patient from being alert to such conditions developing.

Accordingly, it can be vital for a patient at risk of DVT to properly utilize a DVT device. As such, the principles described herein may facilitate the provision of intermittent compression to a limb of a patient for the enhancement of blood and lymph flow while also providing intelligent processing of generated sensor data associated with the user of the DVT device.

FIG. 1 illustrates an example environment 100 for generating and processing sensor data associated with use of a deep vein thrombosis (DVT) device. As shown, FIG. 1 includes DVT device 102, mobile device 110, medical provider servers(s) 112, and network 114. The DVT device 102 is configured to provide intermittent compression of muscles within an extremity of an individual for the enhancement of blood and/or lymph flow in the extremity to prevent deep vein thrombosis, as well as sensor data generation and processing.

Figure 2:
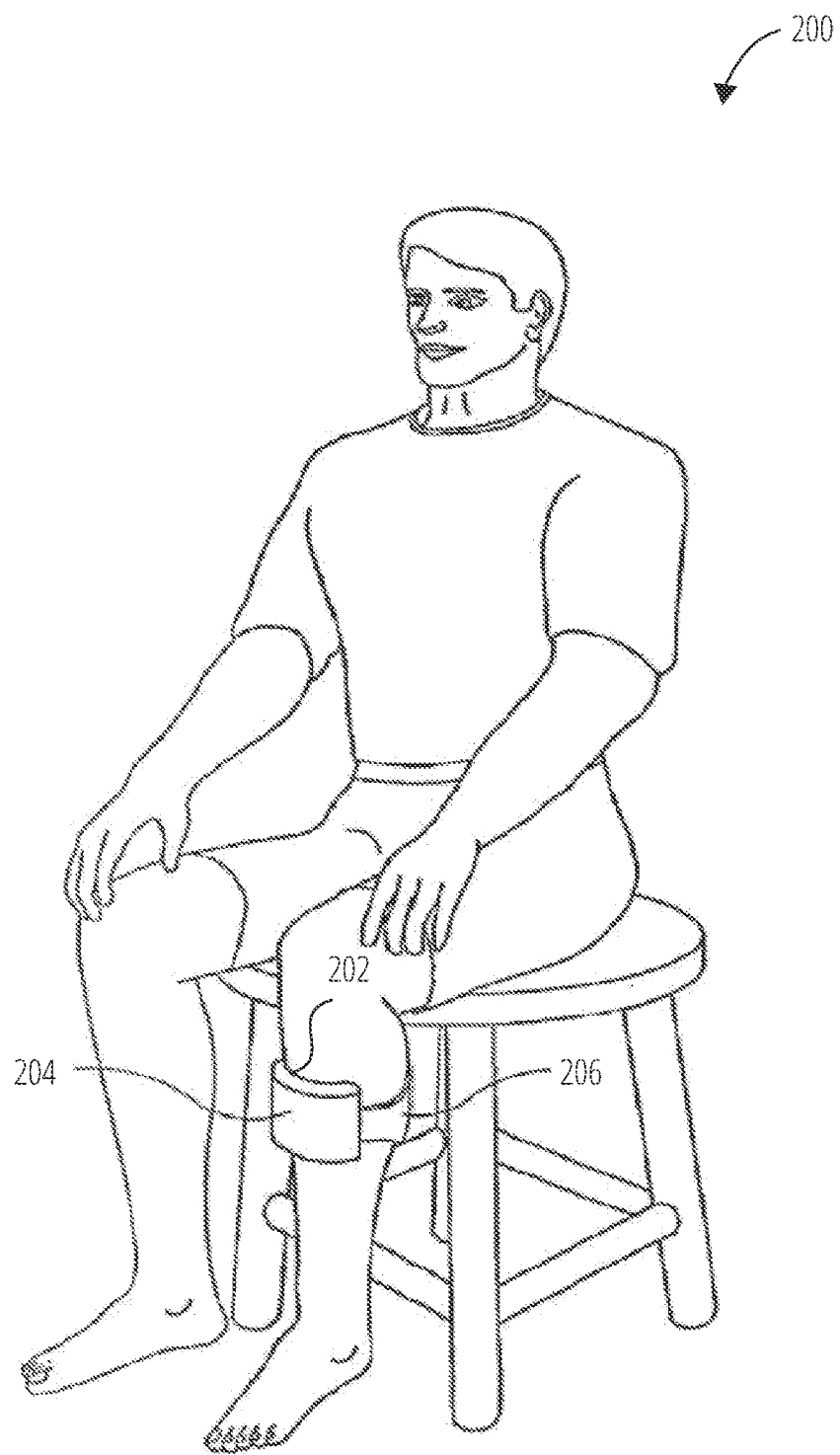
FIG. 2 illustrates an exemplary embodiment of a system for providing intermittent compression of muscles within an extremity of an individual for the enhancement of blood and/or lymph flow in the extremity to prevent DVT.

For instance, FIG. 2 illustrates an example embodiment 200 of the DVT device 102 being worn on the calf of a sitting person. As shown, FIG. 2 includes a mobile DVT device 202. While the DVT device 202 is illustrated as being mobile, in some embodiments, the DVT device 102 may comprise a stationary DVT device. In addition, the example of the DVT device 102 provided in FIG. 2 (i.e., as the mobile DVT device 202) serves only as an example of a DVT device and should not be construed as a limitation to the application of the present invention. In particular, the principles described herein may be practiced with any type of DVT device.

The mobile DVT device 202 may comprise two main components, an assembly box 204 and a strap 206. The assembly box 204 may include components configured to operate the device, including, but not limited to, a power supply, a mechanism(s) for performing intermittent compression of the device (e.g., an energy generating mechanism, an actuator, at least one pressing element, and so forth), an on/off switch, a force regulator for regulating the force exerted on the calf muscle, and a rate regulator for regulating the frequency of intermittent compressions, as well as sensors, communication systems, and so forth, as further described herein.

The strap 206 may be coupled to the assembly box 204 to thereby form a closed loop for encircling an individual's limb or extremity. While not shown in FIG. 2, the strap 206 may also be adjustable to allow for conforming to various sizes of limbs or extremities.

Notably, possible mechanical features of such a DVT device (e.g., the DVT device 102 and the mobile DVT device 202) are described in further detail in U.S. Pat. No. 8,235,921, filed May 1, 2005 and titled COMPUTERIZED PORTABLE DEVICE FOR THE ENHANCEMENT OF CIRCULATION, which is incorporated by reference herein, in its entirety.

Figure 4:
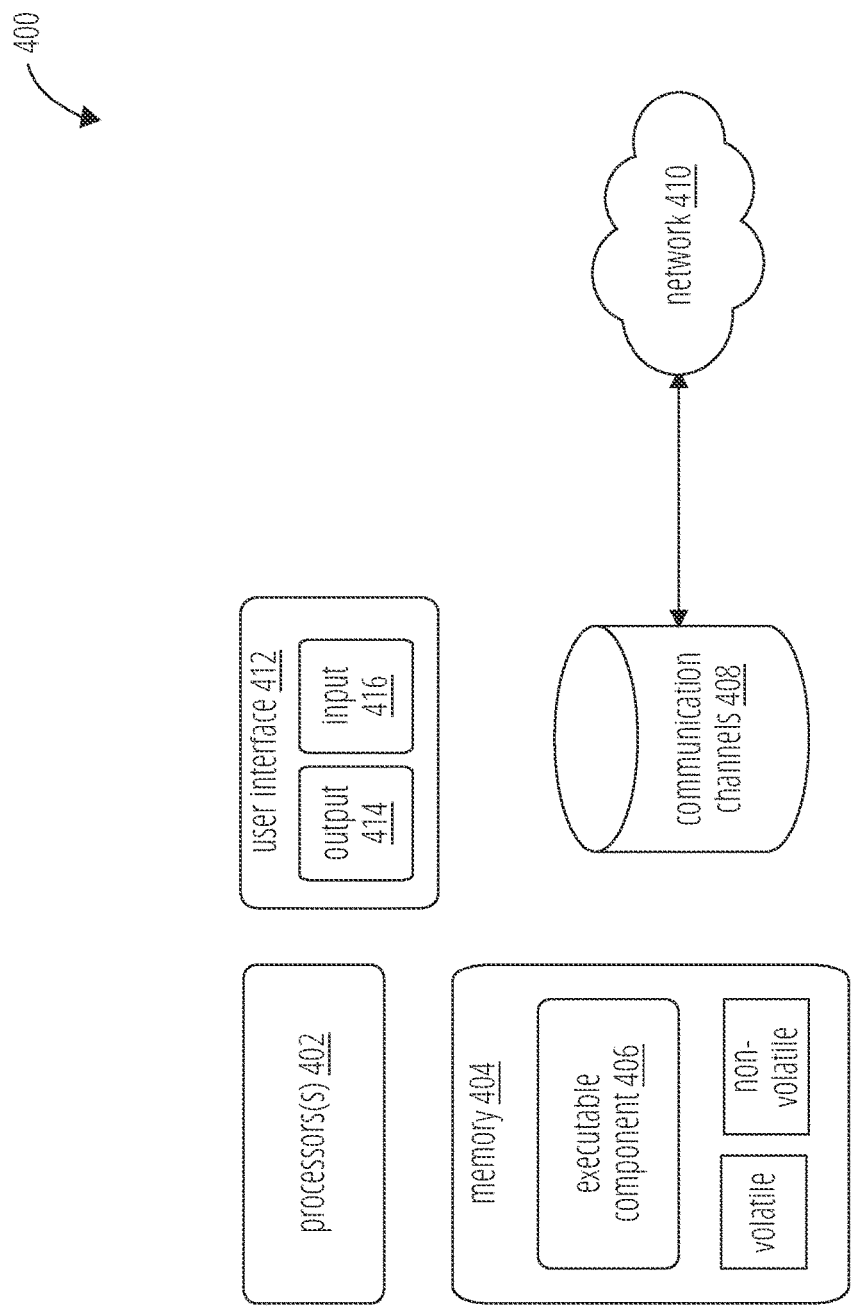
FIG. 4 illustrates an example computer architecture that facilitates operation of the principles described herein.

Returning to FIG. 1, the DVT device 102 may also be at least partially embodied, for example, by computing system 400, as further described with respect to FIG. 4. The DVT device 102 may comprise any type of computer system, including any combination of hardware and/or software that is configured to provide intermittent compression of muscles within an extremity of an individual for the enhancement of blood and/or lymph flow in the extremity to prevent deep vein thrombosis, as well as sensor data generation and processing.

As shown, the DVT device 102 may include various engines, functional blocks, and components, including (as examples) a sensor(s) 104, a sensor data processing engine 106, a database 116, and a communication engine 108, each of which may also include additional engines, functional blocks, and components. The various engines, components, and/or functional blocks of the DVT device 102 may be implemented on a single computer system, or may be implemented as a distributed computer system that includes elements resident in a cloud environment, and/or that implement aspects of cloud computing (i.e., at least one of the various illustrated engines may be implemented locally, while at least one other engine may be implemented remotely). In addition, the various engines, functional blocks, and/or components of the DVT device 102 may be implemented as software, hardware, or a combination of software and hardware.

Notably, the configuration of the DVT device 102 illustrated in FIG. 1 is shown only for exemplary purposes. As such, the DVT device 102 may include more or less than the engines, functional blocks, and/or components illustrated in FIG. 1. Although not explicitly illustrated, the various engines of the DVT device 102 may access and/or utilize a processor and memory, such as the processor(s) processors(s) 402 and the memory 404 of FIG. 4, as needed, to perform their various functions.

As briefly introduced, the DVT device 102 includes the sensor(s) 104, the sensor data processing engine 106, the database 116, and the communication engine 108. The sensor(s) 104 may comprise one or more sensors configured to generate sensor data associated with a user of the device (or potentially associated with an environment of the user). For instance, at least one of the one or more sensors may comprise an on/off switch that is configured to generate use data indicating when the DVT device 102 is in operation (i.e., providing intermittent compression of the DVT device 102). Such use data may further indicate the days in which the DVT device 102 was in use and the duration of time during which the device was in use during the indicated days.

In some embodiments, a temperature sensor may be utilized in conjunction with the on/off switch to ensure that the DVT device 102 is currently in use by an individual rather than simply being in an operative state. More specifically, the temperature sensor may generate temperature data when the DVT device 102 is an operative state, which temperature data may indicate whether or not the device is being worn/used by an individual (i.e., the generated temperature data comprises a temperature that would be indicative of an individual's skin temperature when wearing the device).

Alternatively, or additionally, the sensor(s) 104 may include one or more of a skin temperature sensor, a gyroscope, an accelerometer, an ambient temperature sensor, an audio sensor, a pressure sensor, a blood pressure sensor, a blood-oxygen sensor, a glucometer, and so forth. It should be noted that the types of sensors listed herein are not meant to be limiting in any way, as the principles described herein may be utilized with any type of sensor or environmental data.

Furthermore, while the sensor(s) 104 is illustrated as being located within the DVT device 102, one or more sensors may be located outside of, or remote to, the DVT device 102. In such embodiments, the one or more sensors located outside of the DVT device 102 may be configured to communicate with the DVT device 102 (e.g., by providing sensor data to the DVT device 102 via communication engine 108). In an example, the DVT device 102 may utilize sensor data generated by the mobile device 110. In a specific example, the mobile device 110 may generate movement data from a global positioning system apparatus and/or a gyroscope, which movement data may be shared with the DVT device 102 via its communication engine 108. The DVT device 102 may then process such sensor data (e.g., movement data) using the sensor data processing engine 106, as further described herein. In other examples, the DVT device 102 may utilize sensor data from standalone sensor devices (e.g., pulse oximeters, blood pressure cuffs, thermometer, international normalized ration (INR) test device, and so forth).

As briefly described, the DVT device 102 also includes the sensor data processing engine 106. The sensor data processing engine 106 may be configured to process and analyze generated sensor data. For instance, the sensor data processing engine 106 may process use data to determine a duration of use (i.e., how long the DVT device 102 was used) for any given day. In addition, the sensor data processing engine 106 may process use data to determine an average daily usage amount or a median daily usage amount for a given time period (e.g. Average daily usage amount of 4 hours over the last 3 weeks, median daily usage of 3.5 hours over the last 30 days, and so forth).

In addition, the sensor data processing engine 106 may analyze sensor data in light of protocols or rules. For instance, a user of the DVT device 102 may have been given a protocol to use the device for a particular amount of time each day (e.g., 2 hours, 3 hours, 4 hours, and so forth), as well as a total duration (e.g., 5 hours a day for 30 days, 4 hours a day for 6 weeks, and so forth). Based on such protocol, the sensor data processing engine 106 may analyze associated sensor data (i.e., generated use data, in this case) to determine whether the user of the device is using the device according to provided protocols.

In another example, the sensor data processing engine 106 may analyze generated temperature sensor data in relation to one or more rules regarding appropriate/safe skin temperature of a user of the device. As such, the sensor data processing engine 106 may determine whether a current temperature of a user's skin is unsafe or potentially indicative of a health issue (e.g., DVT, infection, and so forth). Notably, while various examples of processing by the sensor data processing engine 106 are discussed herein, these examples are not meant to be limiting but rather act as examples of the capabilities of sensor data processing engine 106.

In addition, the sensor data processing engine 106 may be configured to perform one or more actions based on processed sensor data. For instance, using the protocol example above, the sensor data processing engine 106 may generate an alert to be sent to a medical professional regarding a high temperature reading, an average DVT device usage below corresponding usage protocols, and so forth. Such an alert may be sent via the communication engine 108, which is further described herein.

In another example, the sensor data processing engine 106 may process usage data to thereby determine that a user of the device is short of the corresponding usage protocol for a given day or averaging less usage per day than a corresponding usage protocol. In such an example, the sensor data processing engine 106 may generate an alert to be sent to the user regarding low usage and/or the corresponding usage protocol. For instance, the sensor data processing engine 106 may generate such an alert, which may then be sent to a device of the user (e.g., the mobile device 110).

While the sensor data processing engine 106 is illustrated as being located within the DVT device 102, in some embodiments, part or all of the sensor data processing engine 106 may be located outside of the DVT device 102. For instance, in such embodiments, the mobile device 110 and/or the medical provider servers(s) 112 may be configured to receive data from DVT device 102 and process such data (e.g., analyze use data in relation to given protocols), as further described herein.

The sensor data processing engine 106 may receive or pull both sensor data and protocols/rules from the database 116. Accordingly, the database 116 may be configured to store both generated sensor data and any associated protocols/rules regardless of the original source of such data or protocols/rules (e.g., regardless of whether any given sensor data was generated by DVT device 102 or received at the DVT device 102 from an outside device such as the mobile device 110). Protocols and rules may be provided by medical professionals (e.g., physicians, nurse practitioners, and so forth) to the DVT device 102 directly or via the medical provider servers(s) 112 or mobile device 110. Additionally, or alternatively, protocols and/or rules may comprise default protocols/rules based on a type of injury of the user. For instance, a knee replacement may have n associated first protocol/rule, a tibia fracture may have an associated second protocol/rule (which may be the same as, or different from, the first protocol/rule), and so forth. In such cases, the database may have a number of possible injuries that are each correlated to one or more protocols/rules. In such embodiments, upon input of a particular injury, the DVT device 102 may be configured to identify a particular default protocol/rule associated with the inputted injury. Notably, the database 116 may comprise any type of computer-readable storage media as further described with respect to FIG. 4.

Data, including but not limited to generated sensor data, data processed by the sensor data processing engine 106 (e.g., average daily DVT device usage), received sensor data, received protocols/rules, and alert data, may be transmitted and/or received by the communication engine 108. The communication engine 108 may comprise any type of communication system that allows the DVT device 102 to communicate with the mobile device 110, network 114, and/or medical provider servers(s) 112 over wired or wireless connections. Notably, such communication systems are also further described with respect to communication channels 408 and the network 410 in FIG. 4. In an example, the communication engine 108 may comprise Bluetooth® technology, Wi-Fi technology, and so forth.

As illustrated in FIG. 1, the environment 100 also includes the mobile device 110. The mobile device 110 may also be embodied, for example, by the computing system 400, as further described with respect to FIG. 4. The mobile device 110 may comprise any type of computer system that is configured to communicate with, utilize the functionality of, and provide additional functionality to the DVT device 102 and the medical provider servers(s) 112, which are described further herein. In an example, the mobile device 110 may comprise a smartphone, a tablet, or a laptop. In addition, the following description of functionality of the mobile device 110 may be at least partially facilitated via a software application of the mobile device 110.

As briefly described, the mobile device 110 may be configured to communicate with, utilize the functionality of, and provide additional functionality to the DVT device 102 and the medical provider servers(s) 112. For instance, in some embodiments, the mobile device 110 may generate sensor data and provide the generated sensor data to the DVT device 102 for further processing (i.e., by the sensor data processing engine 106). In an example, the mobile device 110 may generate usage data. In particular, the DVT device 102 may communicate with the mobile device 110 (e.g., via Bluetooth, via Wi-Fi, and so forth) when the DVT device 102 has been turned on. In such cases, the mobile device 110 may generate the usage data and provide the generated usage data to the DVT device 102 for further processing by the sensor data processing engine 106.

In other embodiments, the mobile device 110 may generate data and process some or all of the data in a similar manner to the sensor data processing engine 106 (e.g., analyzing the data to determine a daily average usage time, analyzing the data in relation to protocols, and so forth). In other embodiments, the mobile device 110 may generate the usage data and provide it to the medical provider servers(s) 112 for further processing. In yet other embodiments, the mobile device 110 may receive sensor data from the DVT device 102 and process the data or transmit the data to the medical provider servers(s) 112 for further processing.

As briefly described, the environment 100 also includes the medical provider servers(s) 112. The medical provider servers(s) 112 may also be embodied, for example, by the computing system 400, as further described with respect to FIG. 4. The medical provider servers(s) 112 may comprise any type of computer system, including any combination of hardware and/or software, that is configured to receive sensor data from the DVT device 102 and the mobile device 110, receive processed sensor data from the DVT device 102 and the mobile device 110, process received sensor data from the DVT device 102 and the mobile device 110, provide processed sensor data (and/or alerts) to the DVT device 102, the mobile device 110, and computing systems associated with medical professionals, receive protocols/rules from computing systems associated with medical professionals, and provide received protocols/rules to the DVT device 102 and the mobile device 110. In particular, the medical provider servers(s) 112 may be implemented on a single computer system, or may be implemented as a distributed computer system that includes elements resident in a cloud environment, and/or that implement aspects of cloud computing. In some embodiments, the medical provider server(s) 112 may comprise a network of computers at a hospital (or other applicable medical facility) that is configured to connect to the mobile device 110 and/or the DVT device 102 via the Internet.

Accordingly, in an example, the medical provider servers(s) 112 may receive sensor data from the DVT device 102 or the mobile device 110 and process the received sensor data similar to the sensor data processing engine 106 (e.g., processing the received sensor data to determine average daily usage, median daily usage, and so forth). The medical provider servers(s) 112 may then be configured to provide the processed data to the mobile device 110 or the DVT device 102. In addition, in response to processing such sensor data, the medical provider servers(s) 112 may also be configured to perform one or more actions (e.g., send an alert to the mobile device 110 or DVT device 102 reminding a user to use the DVT device 102 or to use the device more frequently when it is determined that the user is not using the device according to given protocols/rules).

In another example, whether processed by the DVT device 102, the mobile device 110, or the medical provider servers(s) 112, the medical provider servers(s) 112 may be configured to provide processed sensor data to a medical professional (e.g., a physician, a nurse practitioner, a nurse, and so forth). For instance, such a medical professional may utilize a computing system (e.g., the computing system 400) to access processed data that indicates whether a user (e.g., a patient of the medical professional of the DVT device 102) is using the DVT device 102 in accordance with one or more provided protocols. Similarly, a medical professional may provide protocols or rules (e.g., a number of hours per day that user is to use the DVT device 102) to the medical provider servers(s) 112, which protocols or rules may then be (sent to and/or) utilized by the DVT device 102, the mobile device 110, or the medical provider servers(s) 112 to process generated sensor data in relation to such protocols or rules.

As shown, FIG. 1 also includes the network 114, which may be configured to provide facilitate communication between the various entities of the environment 100 (e.g., the DVT device 102, the mobile device 110, and the medical provider servers(s) 112). In particular, the network 114 may be embodied by the network 410, as further described herein.

Figure 3:
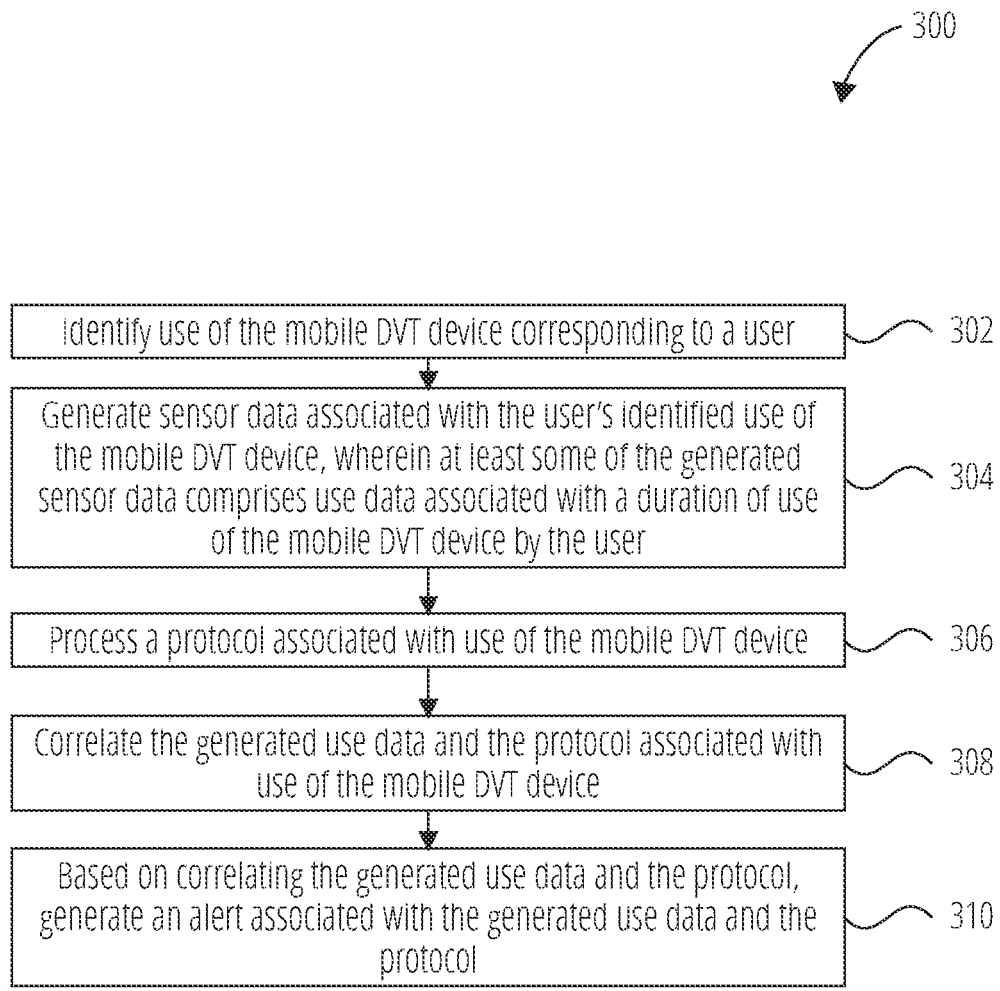
FIG. 3 illustrates a flowchart of a method for analyzing utilization of a mobile deep vein thrombosis (DVT) device, in accordance with one embodiment.

FIG. 3 illustrates a flowchart of a method 300 for processing generated sensor data of a deep vein thrombosis device. In block 302, the method 300 identifies use of the mobile DVT device corresponding to a user. For instance, an on/off switch may be utilized to determine that the DVT device 102 is in use. In another example, both an on/off switch of the DVT device 102 and confirmation by the mobile device 110 may be utilized to ensure the device is in use.

In block 304, the method 300 generate sensor data associated with the user's identified use of the mobile DVT device. At least some of the generated sensor data comprises use data associated with a duration of use of the mobile DVT device by the user. In particular, such use data may be associated with time such that an amount of time of usage during any given day may be analyzed or determined. In addition to the use data, the DVT device 102 and/or the mobile device 110/other standalone sensor generating devices may generate other types of data including temperature, blood pressure, oxygen levels, movement, and so forth.

In block 306, the method 300 processes a protocol associated with use of the mobile DVT device. For example, the DVT device 102 may utilize a default protocol for an inputted injury, both of which may be stored at the database 116. In another example, a protocol may be provided by a medical professional via the medical provider servers(s) 112.

In block 308, the method 300 correlates the generated use data and the protocol associated with use of the mobile DVT device. For instance, the sensor data processing engine 106 of the DVT device 102, the mobile device 110, or the medical provider servers(s) 112 may process the generated sensor data (i.e., use data) in relation to an applicable protocol. More specifically, such processing may result in determining whether the generated sensor data meets the applicable protocol (e.g., did the patient use the DVT device 102 as often for a given day, or on average during an entire duration of use of the device, as the protocol indicated).

In block 310, the method 300 based on correlating the generated use data and the protocol, generates an alert associated with the generated use data and the protocol. In an example, the DVT device 102, the mobile device 110, and/or the medical provider servers(s) 112 may generate an alert based on processed sensor data regarding any action items (e.g., the DVT device 102 is to be used more often, the patient is to seek medical attention based on a current skin temperature of the patient that indicates infection or DVT, and so forth).

Some general discussion of a computing system will now be described with respect to FIG. 4. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, smart watches, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 4, in its most basic configuration, a computing system 400 typically includes at least one hardware processing unit 102 (or processors(s) 402 and memory 404. The memory 404 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 400 also has thereon multiple structures often referred to as an "executable component." For instance, the memory 404 of the computing system 400 is illustrated as including executable component 406. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component is binary). Alternatively, the structure may be configured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 404 of the computing system 400. Computing system 400 may also contain communication channels 408 that allow the computing system 400 to communicate with other computing systems over, for example, network 410.

While not all computing systems require a user interface, in some embodiments, the computing system 400 includes a user interface 412 for use in interfacing with a user. The user interface 412 may include output 414 (or output mechanism(s) 114) as well as input 416 (or input mechanism(s) 116). The principles described herein are not limited to the precise type of output 414 or type of input 416 as such will depend on the nature of the device. However, output 414 might include, for instance, speakers, displays, tactile output, holograms and so forth. Examples of input 416 might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" (e.g., the network 410) is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable storage media having stored thereon computer executable instructions that are executable by the one or more processors to cause the computing system to process generated sensor data of a mobile deep vein thrombosis (DVT) device, the computer-executable instructions including instructions that are executable to cause the computing system to perform at least the following:
   identify use of the mobile DVT device corresponding to a user;
   generate sensor data associated with the user's identified use of the mobile DVT device that provides intermittent compression, wherein at least some of the generated sensor data comprises use data associated with a duration of use of the mobile DVT device by the user;
   process a protocol associated with use of the mobile DVT device;
   correlate the generated use data and the protocol associated with use of the mobile DVT device; and
   based on correlating the generated use data and the protocol, generate an alert associated with the generated use data and the protocol;
   wherein use of the mobile DVT device is determined from the mobile DVT device being in an operative state and from skin temperature data from a temperature sensor indicating that the mobile DVT device is actively being worn by the user.

2. The computing system of claim 1, wherein identifying use of the mobile DVT device includes processing first data generated by an on/off switch and second data generated by a mobile device of the user.

3. The computing system of claim 1, wherein the generated sensor data also includes skin temperature data.

4. The computing system of claim 1, wherein the protocol is generated based on an identification of a type of injury associated with the user.

5. The computing system of claim 1, wherein the computer-executable instructions further include instructions that are executable to cause the computing system to:
   process the generated use data, wherein processing the generated use data includes determining an average amount of use per day of the mobile DVT device by the user.

6. The computing system of claim 1, wherein the generated alert is sent to at least one of a mobile device of the user or a computing system associated with a medical professional.

7. The computing system of claim 1, wherein the generated alert comprises at least one of an indication to use the mobile DVT device more often and an indication to seek further medical attention.

8. A method, implemented at a computing system that includes one or more processors, for processing generated sensor data of a mobile deep vein thrombosis (DVT) device, comprising:
   identifying use of the mobile DVT device corresponding to a user;
   generating sensor data associated with the user's identified use of the mobile DVT device that provides intermittent compression, wherein at least some of the generated sensor data comprises use data associated with a duration of use of the mobile DVT device by the user;
   processing a protocol associated with use of the mobile DVT device;
   correlating the generated use data and the protocol associated with use of the mobile DVT device; and
   based on correlating the generated use data and the protocol, generating an alert associated with the generated use data and the protocol;
   wherein use of the mobile DVT device is determined from the mobile DVT device being in an operative state and from skin temperature data from a temperature sensor indicating that the mobile DVT device is actively being worn by the user.

9. The method of claim 8, wherein identifying use of the mobile DVT device includes processing first data generated by an on/off switch and second data generated by a mobile device of the user.

10. The method of claim 8, wherein the generated sensor data also includes movement data.

11. The method of claim 8, wherein the protocol is generated based on an identification of a type of injury associated with the user.

12. The method of claim 8, further comprising:
   processing the generated use data, wherein processing the generated use data includes determining an average amount of use per day of the mobile DVT device by the user.

13. The method of claim 8, wherein the generated alert is sent to at least one of a mobile device of the user or a computing system associated with a medical professional.

14. The method of claim 8, wherein the generated alert comprises at least one of an indication to use the mobile DVT device more often and an indication to seek further medical attention.

15. A computer program product comprising one or more computer readable media having stored thereon computer-executable instructions that are executable by one or more processors of a computing system to cause the computing system to process generated sensor data of a mobile deep vein thrombosis (DVT) device, the computer-executable instructions including instructions that are executable to cause the computing system to perform at least the following:

identify use of the mobile DVT device corresponding to a user;
generate sensor data associated with the user's identified use of the mobile DVT device that provides intermittent compression, wherein at least some of the generated sensor data comprises use data associated with a duration of use of the mobile DVT device by the user;
process a protocol associated with use of the mobile DVT device;
correlate the generated use data and the protocol associated with use of the mobile DVT device; and
based on correlating the generated use data and the protocol, generate an alert associated with the generated use data and the protocol;
wherein use of the mobile DVT device is determined by the mobile DVT device actively providing intermittent compression; and
wherein use of the mobile DVT device is determined from the mobile DVT device being in an operative state and from skin temperature data from a temperature sensor indicating that the mobile DVT device is actively being worn by the user.

16. The computer program product of claim 15, wherein identifying use of the mobile DVT device includes processing first data generated by an on/off switch and second data generated by a mobile device of the user.

17. The computer program product of claim 15, wherein the generated sensor data also includes skin temperature data.

18. The computer program product of claim 15, wherein the protocol is generated based on an identification of a type of injury associated with the user.

19. The computer program product of claim 15, wherein the computer-executable instructions further include instructions that are executable to cause the computing system to:

process the generated use data, wherein processing the generated use data includes determining an average amount of use per day of the mobile DVT device by the user.

20. The computer program product of claim 15, wherein the generated alert is sent to at least one of a mobile device of the user or a computing system associated with a medical professional.

* * * * *